United States Patent [19]
Taniguchi et al.

[11] Patent Number: 5,151,860
[45] Date of Patent: Sep. 29, 1992

[54] CONTROL METHOD FOR ELECTRIC POWER STEERING APPARATUS FOR VEHICLE

[75] Inventors: Yoshiaki Taniguchi; Masaki Watanabe, both of Saitama; Ryuji Iizawa; Fumitoshi Mori, both of Kanagawa, all of Japan

[73] Assignees: Jidoshi Kiki Co., Ltd., Tokyo; Fujitsu, Ltd., Kanagawa, both of Japan

[21] Appl. No.: 798,026

[22] Filed: Nov. 20, 1991

Related U.S. Application Data

[63] Continuation of Ser. No. 290,697, Dec. 27, 1988, abandoned.

[30] Foreign Application Priority Data

Dec. 29, 1987 [JP] Japan .................. 62-335531

[51] Int. Cl.⁵ .................................... B62D 5/04
[52] U.S. Cl. .................. 364/424.05; 180/79.1; 180/142
[58] Field of Search ............ 364/424.05; 180/140, 180/141, 142, 143, 79.1

[56] References Cited

U.S. PATENT DOCUMENTS

| | | | |
|---|---|---|---|
| 4,753,309 | 6/1988 | Marumoto et al. | 180/79.1 |
| 4,754,829 | 7/1988 | Shimizu | 180/79.1 |
| 4,836,319 | 6/1989 | Haseda et al. | 180/79.1 |
| 4,837,692 | 6/1989 | Shimizu | 364/424.05 |
| 4,840,389 | 6/1989 | Kawabe | 364/424.05 |

FOREIGN PATENT DOCUMENTS

| | | | |
|---|---|---|---|
| 0229866 | 11/1985 | Japan | 180/79.1 |
| 0202973 | 9/1986 | Japan | 180/79.1 |

*Primary Examiner*—Gary Chin
*Attorney, Agent, or Firm*—Blakely Sokoloff Taylor and Zafman

[57] ABSTRACT

In a control method of an electric power steering apparatus for a vehicle, a target value generator for setting a target value of a steering force or a motor output and a primary delay system with a variable damper value according to a vehicle speed are arranged in a control unit, and an electric power steering unit is controlled using a value obtained by filtering a difference between the target value set by the target value generator and an actual value through the primary delay system.

4 Claims, 4 Drawing Sheets

CONTROL METHOD FOR ELECTRIC POWER STEERING APPARATUS FOR VEHICLE

This is a continuation of application Ser. No. 290,697 filed Dec. 27, 1988 now abandoned.

BACKGROUND OF THE INVENTION

The present invention relates to a control method for an electric power steering apparatus for a vehicle.

As a conventional motor controller for an electric power steering apparatus for a vehicle, an apparatus which has a torque sensor for detecting a torque based on a steering operation of a steering wheel performed by a driver (or operator), and controls a rotational direction and a rotational torque of a motor in accordance with an output signal from the torque sensor is known (Japanese Patent Publication No. 45-41246).

In an electric power steering apparatus for a vehicle, a power steering unit consisting of a motor and reduction gears suffers from a large inertia unlike in a conventional hydraulic steering apparatus. When the inertia is large, a mechanism cannot be easily moved and once the mechanism moves, it cannot be easily stopped. For this reason, if a self-aligning torque (force for returning a steering wheel) is increased in a high-speed state, the steering wheel is not stopped at the center and is turned toward the opposite side by its returning force, thus impairing convergence. Since the movement of the steering wheel is not sharp due to the inertia even in a low-speed state, the power steering apparatus performs return control for returning the steering wheel, thus further impairing convergence.

SUMMARY OF THE INVENTION

It is therefore an object of the present invention to provide an electric power steering apparatus for a vehicle, which can provide good convergence in both high- and low-speed states.

In order to achieve the above object, according to the present invention, there is provided a control method for an electric power steering apparatus for a vehicle, in which a torque based on a steering operation performed by a driver is detected by a torque sensor, and an electric power steering unit is controlled through a control unit in accordance with an output from the torque sensor, wherein the control unit has target value setting means for setting a target value of a steering force or a motor output, and primary delay system setting means for setting a primary delay system having a variable damper value according to a vehicle speed, and the electric power steering unit is controlled using a value obtained by filtering a difference between the target value set by the target value setting means and an actual value through the primary delay system set by the primary delay system setting means.

In the electric power steering apparatus for a vehicle according to the present invention, a light steering operation in a low-speed state and a steering operation with good convergence and appropriate steering force in a high-speed state can be achieved.

DESCRIPTION OF THE PREFERRED EMBODIMENT

In general, convergence of a steering operations of a vehicle is degraded with an increase in vehicle speed. One cause is that a self-aligning torque (force for returning a steering wheel, to its center position is increased as a vehicle speed is increased, and the steering wheel is strongly returned after the steering operation, thus causing an overshoot phenomenon (a steering angle upon returning the center goes beyond the center toward the opposite side). If hands are released from the steering wheel, the overshoot phenomenon repetitively occurs, and a vehicle travels in a zig-zag manner. In a full-electric power steering apparatus in which a motor is attached to a steering shaft, this tendency is conspicuous. In order to prevent this, if a uniform damper is used, the steering wheel cannot be lightly turned in the low-speed state, and sufficient convergence cannot be obtained in the high-speed state. In an electric power steering apparatus for a vehicle according to the present invention, in order to eliminate the above drawbacks, a damper for braking a motor is arranged for control, so that damping (viscosity) is changed along with an increase in vehicle speed.

Figure 1:
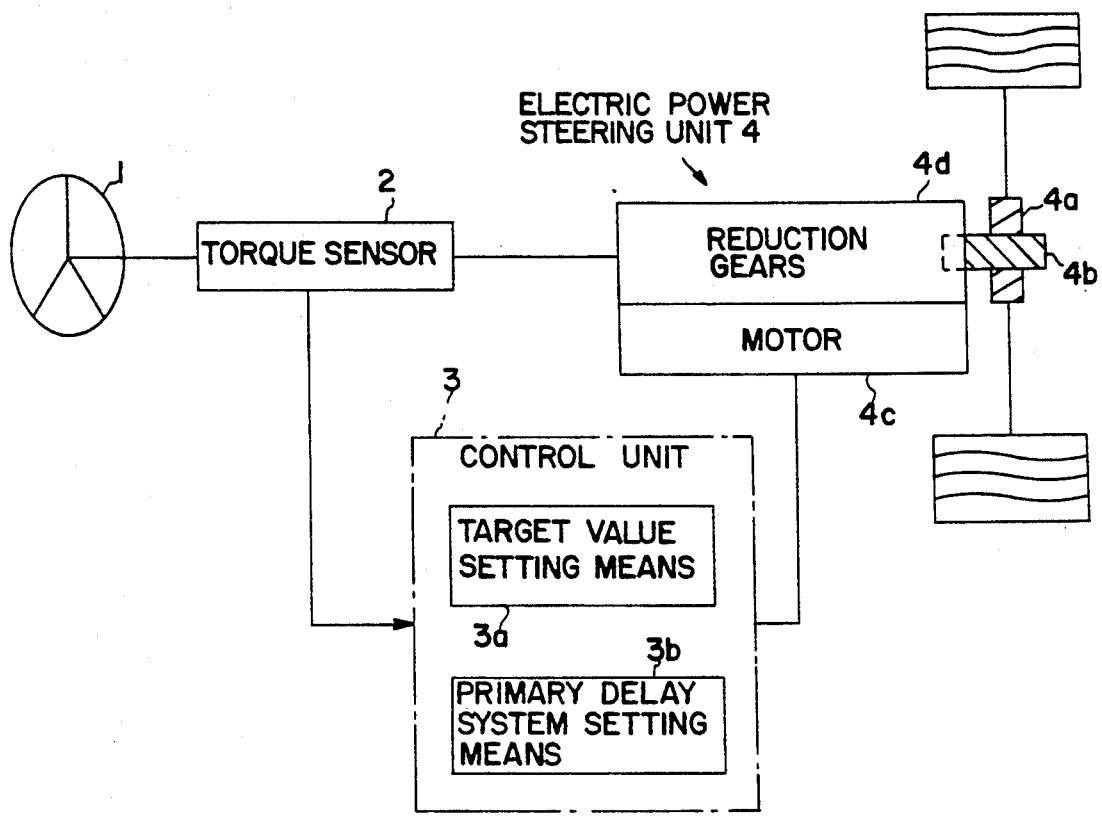
FIG. 1 is a diagram showing an arrangement for explaining a principle of the present invention.

FIG. 1 shows the arrangement for explaining the principle of the present invention. In FIG. 1, reference numeral 1 denotes a steering wheel; 2, a torque sensor for detecting a torque based on an operation of the steering wheel 1; 3, a control unit for controlling an electric power steering unit 4 based on an output from the torque sensor 2; 3a, a target value setting means in the control unit 3, for setting a target value of a steering force or a motor output; and 3b, a primary delay system setting means in the control unit 3, for setting a primary delay system with a variable damper value according to a vehicle speed. The electric power steering unit 4 includes a pinion 4b engaged with a rack 4a coupled to wheels, a motor 4c, and reduction gears 4d arranged between the motor 4c and the pinion 4b, as is known to those who are skilled in the art. In this arrangement, the electric power steering unit 4 is controlled using a value obtained by filtering a difference between the target value set by the target value setting means 3a and an actual value through the primary delay system set by the primary delay system setting means 3b.

Figure 3:
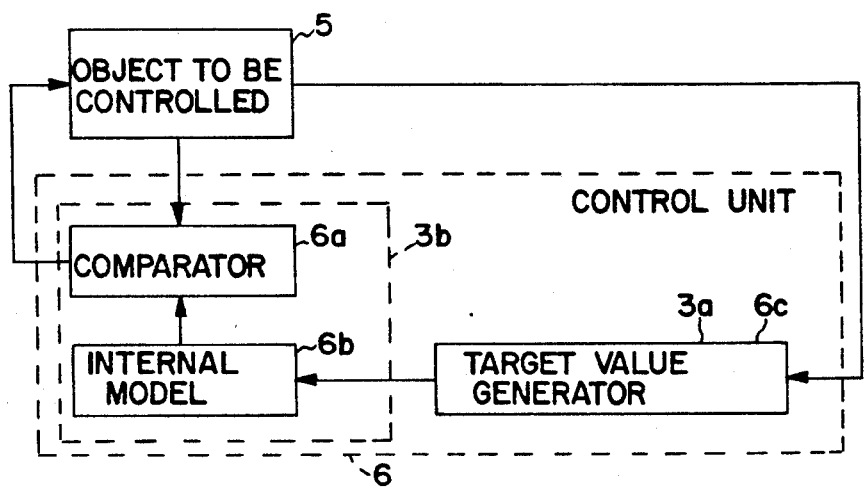
FIG. 3 is a diagram schematically showing a control system to which the present invention is applied.
Figure 4:
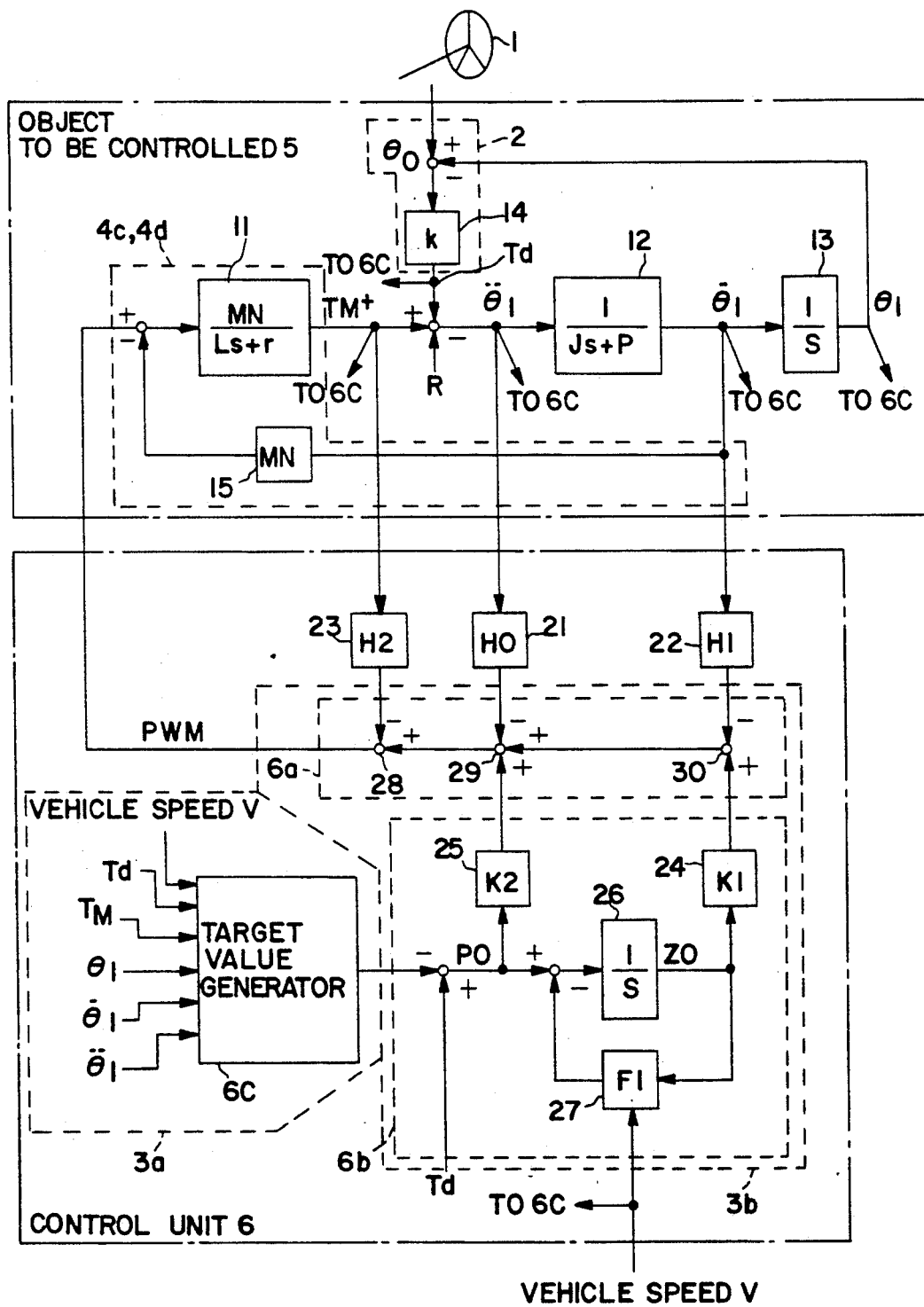
FIG. 4 is a block diagram representing the control system shown in FIG. 3 by transfer functions.

FIGS. 3 and 4 show a control system to which an embodiment of a control method for the electric power steering apparatus for a vehicle according to the present invention is applied. In FIGS. 3 and 4, reference numeral 5 denotes an object to be controlled; and 3, denotes a control unit consisting of a target value generator 3a and a primary delay system setting means 3b. The primary delay system setting means 3b consists of a comparator 6a and an internal model 6b.

In FIG. 4, reference numerals 11 and 15 denote transfer functions indicating a function of converting a voltage into a current in the motor (consisting of a reactance L, a resistance r, and a motor constant M of the motor 4a, and a reduction gear ratio N of the reduction gears 4d), and a function of decreasing a voltage according to a pinion angular velocity $\dot{\theta}_1$; 12, denotes a transfer function representing a primary delay steering system (J is the inertial moment, and P is the viscosity coefficient); denotes 13, denotes a transfer function representing conversion of the pinion angular velocity $\dot{\theta}_1$ into a pinion angle; and 14, a denotes transfer function representing conversion of a difference between a steering angle $\theta_0$ by a driver and a pinion angle $\theta_1$ into a steering torque Td. Note that reference symbol R denotes a reactive force against a steering force and an output from the motor (rotational force), and corresponds to a force returning from a road surface to the pinion shaft. Reference symbol S denotes a transformation quantity in the Laplace transformation.

In FIG. 4, reference numeral 6c denotes a target value generator; 21, 22, and 23, denotes transfer functions representing proportionality constants of a pinion angular acceleration $\ddot{\theta}_1$, the pinion angular velocity $\dot{\theta}_1$, and a motor torque value $T_M$; 24 and 25, denotes transfer functions representing proportionality constants of a difference P0 between the target value and an actual value and an output value Z0 of an ideal primary delay system; 26, an ideal primary delay system; 26, denotes a transfer function of an integral function; 27, denotes a transfer function serving as a damper; and 28, 29 and 30, denote adders for generating a pulse-width modulation signal PWM for controlling a motor voltage. The transfer functions 26 and 27 constitute the ideal primary delay system.

In FIG. 4, the object 5 to be controlled is represented by the transfer functions 11 to 15, and a portion excluding the transfer functions 21 to 23 and adders 28 to 30 represents an ideal control system, i.e., one always having good convergence.

The control system shown in FIG. 4 controls the motor so that the function of the object 5 approximates the function of the ideal control system. The transfer function 27 as a damper having a damper value F1 changes depending on a vehicle speed, so that a control system with good convergence of a vehicle with respect to every vehicle speed can be obtained.

FIGS. 5A to 6B show an embodiment of the control system.

Figure 5A:
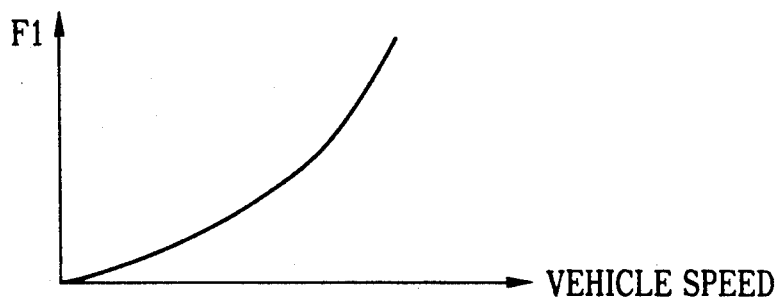
FIGS. 5A and 5B and FIGS. 6A and 6B are graphs showing convergence and response time of a vehicle according to the method of the present invention.
Figure 5B:
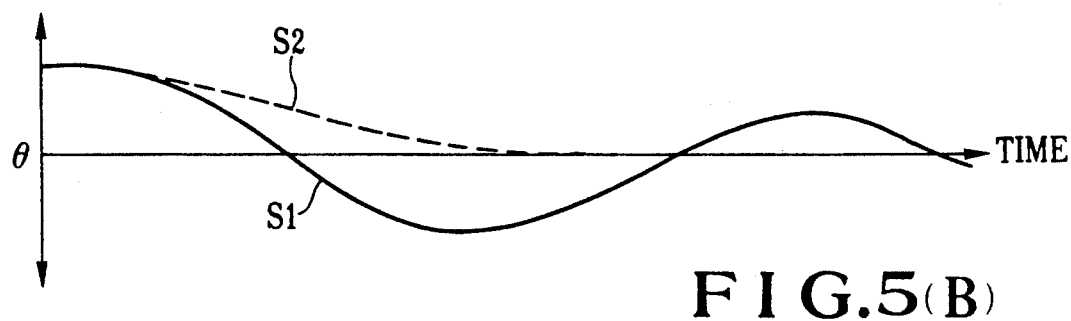

FIGS. 5A shows a case wherein the damper value F1 is increased in accordance with a vehicle speed, and FIG. 5B shows convergence in a high-speed range when hands are released from a steering wheel, i.e., a response time of the steering angle $\theta_0$. A solid curve S1 represents convergence by conventional control, and a dotted curve S2 represents convergence by control shown in FIG. 4.

Figure 6A:
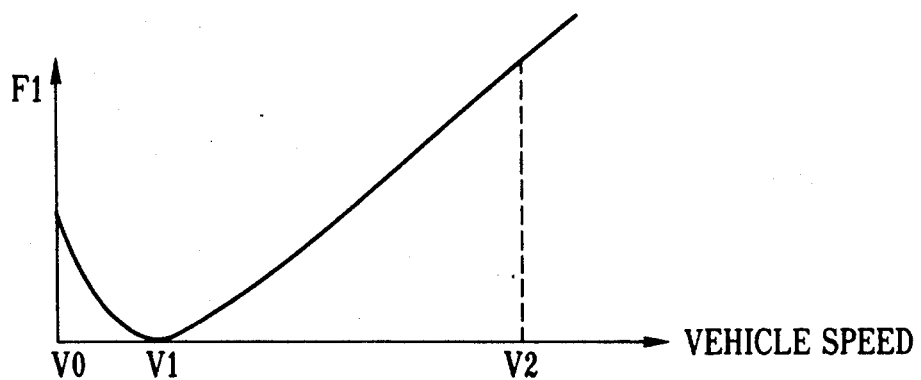
Figure 6B:
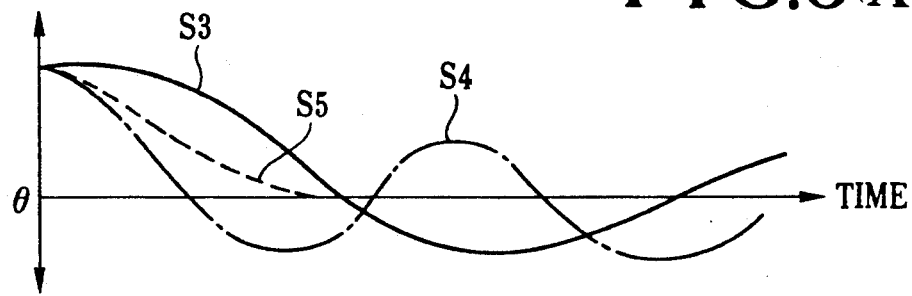

FIGS. 6A and 6B show a case wherein the target value generator 6c also performs return control to return a steering wheel. In this case, the damper value F1 is decreased before a vehicle speed V1 in order to shorten a response time in a low-speed state as compared to the case shown in FIGS. 5A and 5B. FIG. 6A shows the damper value F1, and FIG. 6B shows convergence, i.e., a response time of the steering angle $\theta_0$. In FIG. 6B, a solid curve S3 corresponds to a case wherein no return control is made, i.e., conventional control is made, and an alternate long and short dashed curve S4 corresponds to a case wherein return control is made, and a dotted curve S5 represents a response time when the control unit shown in FIG. 4 also performs return control. As shown in FIG. 6A, the predetermined damper value F1 is provided to the control system so as to provide good steering feeling at a vehicle speed "0" (vehicle speed V0), i.e., when a steering wheel is turned while a vehicle stands still. At a vehicle speed V1 in a low-speed state, a small damper value F1 is set. In middle- and high-speed states, a large damper value F1 is set. Thus, a short response time and good convergence can be realized at the same time.

Figure 2:
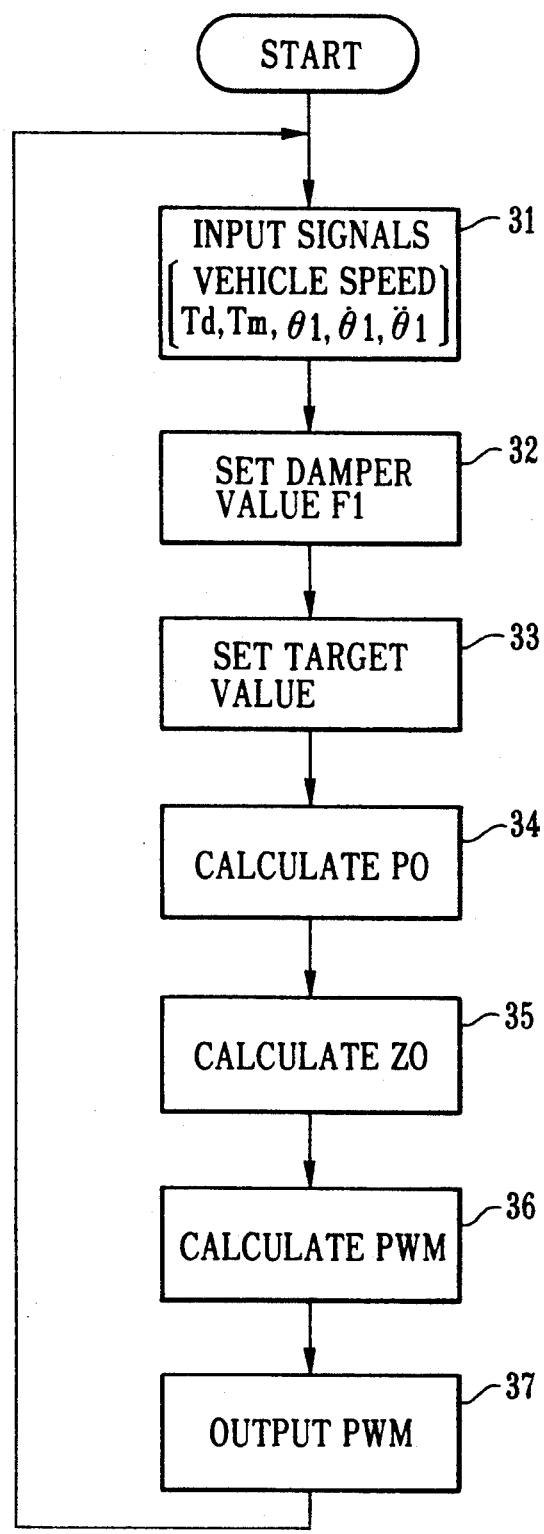
FIG. 2 is a flow chart for explaining an embodiment of a control method of an electric power steering apparatus for a vehicle according to the present invention.

FIG. 2 is a flow chart for explaining an embodiment of a control method for an electric power steering apparatus for a vehicle according to the present invention. First, a vehicle speed signal V, Td, $T_M$, $\ddot{\theta}_1$, $\dot{\theta}_1$, and $\theta_1$ are input (step 31), the damper value F1 is set (step 32), and a target value is set (step 33). The difference P0 is calculated based on a difference between the target value and the actual value (step 34). A variable Z0 is output by the transfer functions 26 and 27 (step 35). The pulse-width modulation signal PWM is calculated based on the variable Z0 and the difference P0, and is output to the transfer function 11 of the motor (steps 36 and 37).

Note that in the embodiment shown in FIG. 1, the reduction gears 4d are directly coupled to the pinion 4b coupled to the rack 4a. However, the reduction gears may be coupled to a worm gear provided to a steering shaft. The reduction gears 4d may be coupled to the rack 4a or a mechanism linked with the rack. The mechanism linked with the rack 4a may be directly driven by the output from the motor 4c without going through the reduction gears 4d.

According to the present invention as described above, a target value setting means for setting a target value of a steering force or a motor output and a primary delay system setting means for setting a primary delay system with a variable damper value according to a vehicle speed are arranged in a control unit, and an electric power steering unit is controlled using a value obtained by filtering a difference between the target value set by the target value setting means and an actual value through the primary delay system set by the primary delay system setting means, so that both convergence and response time can be controlled in correspondence with a vehicle speed. Therefore, a vehicle response with optimal convergence and response time can be obtained in both the low- and high-speed states. As a result, a light steering operation in the low-speed state and a stable steering operation with an appropriate steering force in the high-speed state can be realized.

What is claimed is:

1. A control system for an electric power steering apparatus for a vehicle, said control system comprising:

a torque sensor which is used to detect a steering torque resulting from a steering operation performed by a driver;

a target value setting means for setting a predetermined target value relating to a power steering control of said steering apparatus; and a primary delay system setting means including:

a first comparator means for comparing said detected steering torque with said predetermined target value, an arithmetic amplifier including an amplifier with a gain (F1), said gain being varied in accordance with the speed of the vehicle, a second comparator means for comparing an output (P0) of said first comparator with an output of said amplifier, an integrating means (26) for integrating an output of said second comparator means and generating said integrated output as an output of said arithmetic amplifier, and a third comparator means (30,28) for comparing said output of said integrating means with signals relating to mechanical and electrical compensation delay of said steering torque to generate a control signal transmitted to a motor means of said control system for preventing oversteering of said vehicle.

2. The system according to claim 1 wherein said target value is a steering force.

3. The system according to claim 1 wherein said target value is a motor output.

4. The system according to claim 1 wherein the output of said integrating means is transmitted to said amplifier.

* * * * *

UNITED STATES PATENT AND TRADEMARK OFFICE
CERTIFICATE OF CORRECTION

PATENT NO. : 5,151,860
DATED : September 29, 1992
INVENTOR(S) : Taniguchi et al.

It is certified that error appears in the above-indentified patent and that said Letters Patent is hereby corrected as shown below:

Col. 2, line 14, delete "," after "wheel", and insert --)-- after "position";
    line 18, change "returning" to --reaching--;

Col. 3, line 4, delete "denotes" (first occurrence);
    line 6, change "a denotes" to --denotes a--;
    lines 16 and 19, change "denotes" to --denote--;

Col. 4, line 10, change "$\dot{\theta}_1, \theta_1$" to --$\theta_1, \dot{\theta}_1$--.

Signed and Sealed this

Second Day of May, 1995

Attest:

BRUCE LEHMAN

Attesting Officer          Commissioner of Patents and Trademarks